US012780638B2

(12) United States Patent
Kinder

(10) Patent No.: US 12,780,638 B2
(45) Date of Patent: Nov. 3, 2026

(54) APPARATUS FOR FILLING CONTAINERS AND ASSOCIATED OPERATING METHOD

(71) Applicant: KRONES AG, Neutraubling (DE)

(72) Inventor: Waldemar Kinder, Bad Abbach (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 19/213,278

(22) Filed: May 20, 2025

(65) Prior Publication Data

US 2025/0353721 A1 Nov. 20, 2025

(30) Foreign Application Priority Data

May 20, 2024 (DE) ..................... 10 2024 114 038.0

(51) Int. Cl.
*B67C 3/28* (2006.01)
*B67C 3/00* (2006.01)
*B67C 3/26* (2006.01)

(52) U.S. Cl.
CPC ................ *B67C 3/28* (2013.01); *B67C 3/001* (2013.01); *B67C 3/26* (2013.01); *B67C 2003/2602* (2013.01)

(58) Field of Classification Search
CPC ... B65B 3/22; B67C 3/001; B67C 2003/2602; B67C 3/28
See application file for complete search history.

(56) References Cited

U.S. PATENT DOCUMENTS 8,794,275 B2 8/2014 Gruber et al.
9,963,335 B2 5/2018 Clusserath
2012/0174529 A1 7/2012 Cluesserath
2014/0238531 A1* 8/2014 Muszinski ................ B67C 3/22 141/1
2014/0360624 A1* 12/2014 Clusserath .............. B67C 3/001 141/95
2016/0052767 A1* 2/2016 Eaton .................... B65B 59/001 141/383

FOREIGN PATENT DOCUMENTS

DE 102007022259 A1 1/2009
DE 102009051160 A1 5/2011
DE 102016105552 A1 9/2017
DE 102022119477 A1 2/2024
EP 2754637 A1 7/2014
WO WO 2014/161628 A1 10/2014

OTHER PUBLICATIONS

European Search Report for related European Patent Application No. 25 176 256.3 dated Oct. 10, 2025.

* cited by examiner

*Primary Examiner* — Jason K Niesz
(74) *Attorney, Agent, or Firm* — Caesar Rivise, PC

(57) ABSTRACT

The invention relates, inter alia, to an apparatus for filling containers with a filling material. The apparatus has a filling material reservoir and a supply line which is connected to the filling material reservoir. The apparatus further has a filling element with a filling valve and a filling line which connects the filling material reservoir and the filling valve. The apparatus further has a further line which is connected to the filling line for media discharge and/or media supply, and a bypass line which connects the filling material supply line and the further line to one another.

20 Claims, 1 Drawing Sheet

APPARATUS FOR FILLING CONTAINERS AND ASSOCIATED OPERATING METHOD

CROSS-REFERENCE TO RELATED APPLICATIONS

This application claims the benefit under 35 U.S.C. § 119(a) of German Patent Application No. DE 10 2024 114 038.0, filed May 20, 2024, entitled APPARATUS FOR FILLING CONTAINERS AND ASSOCIATED OPERATING METHOD, and whose entire disclosure is incorporated by reference herein.

TECHNICAL FIELD

The invention relates to an apparatus, preferably a rotary apparatus, for filling containers with a filling material. The invention also relates to a method for operating the apparatus.

TECHNICAL BACKGROUND

In beverage filling plants, when filling containers with a liquid or pasty filling material, gas bubbles, such as air bubbles, can settle in the filling element. These can occur for example when the filling valve is closed after filling a container, and can be drawn into the filling element. The gas bubbles in the filling element can negatively affect the filling process. For example, the formation of the filling jet can be impaired, and unwanted foam formation can occur. These effects can for example lead to a worse standard deviation in the filling parameters and filling key figures, as well as to a poorer filling quality overall.

To reduce the number of gas bubbles in the filling element, the filling element can be vented.

For example, DE 10 2022 119 477 A1 discloses that a buffer tank is arranged above the filling elements. The filling product guide located between the filling elements and the buffer tank is realized in such a way that it is continuously rising. Accordingly, there is no siphon effect. This allows any gas that may be present in the filling element to continuously rise to the buffer tank and vent into it.

This conventional technology is particularly effective in combination with standard filling valves and can be used with large line diameters and filling material throttles with a comparatively large flow cross-section. The disadvantage of this technology, however, is that it barely works or does not work at all in particular with small container filling valves (e.g., for filling high-quality spirits) and small line diameters and filling material throttles with a comparatively small flow cross-section. The gas bubbles then barely rise on their own, or do not do so at all.

The invention is based upon the object of providing an improved technology for venting a filling element for discharging gas bubbles in the filling element. Preferably, the technology is to be particularly effective in small container filling valves/small line diameters/filling material throttles with small flow cross-section.

SUMMARY OF THE INVENTION

The object is achieved by the features of the independent claims. Advantageous developments are specified in the dependent claims and the description.

One aspect relates to an apparatus, preferably a rotary apparatus, for filling containers with an (e.g., liquid or pasty) filling material. The apparatus has a filling material reservoir (e.g., filling material tank or filling material vessel, preferably filling material ring vessel) for storing the filling material and an (e.g., main) supply line which is connected to the filling material reservoir for supplying the filling material to the filling material reservoir (e.g., directly). The apparatus further has a filling element with a filling valve for filling the container (e.g., positioned below the filling element) with the filling material and a filling line which (e.g., directly) connects the filling material reservoir and the filling valve to one another for supplying the filling material from the filling material reservoir to the filling valve. The apparatus further has a further line which is connected (e.g., directly) to the filling line for media discharge and/or media supply (e.g., of a liquid or gaseous medium). The apparatus further has a bypass line which connects (e.g., directly) the filling material supply line and the further line to one another for supplying the filling material from the supply line via the further line and the filling line to the filling material reservoir, preferably for venting the filling element (e.g., the filling line in the filling element and/or when the filling valve is closed).

Advantageously, the apparatus allows a venting of the filling line in the filling element up to the filling valve. This allows for advantageous venting within a few seconds. The gas bubbles can be conveyed in the direction of the filling material reservoir, wherein the filling element and the filling material reservoir are filled with the filling material in reverse, so to speak, i.e., opposite the normal flow direction in the filling line when filling the containers. Even if air is repeatedly introduced during filling, the reverse filling advantageously removes it back towards the filling material reservoir. The technology advantageously does not require a collecting tray below the filling element, since the filling material is preferably not pushed out of the filling element towards the front, but towards the rear in the direction of the filling material reservoir. The technology is particularly advantageous for small container filling elements with very small flow cross-sections, where conventional venting techniques achieve only unsatisfactory results. Advantageously, reverse filling is made possible by the bypass line, which allows the filling material to be supplied via the further line to the filling element. In this connection, the bypass line also advantageously allows the further line to be used for a different purpose, which, in addition to its actual task, e.g., discharging filling material or cleaning medium from the filling line at a desired time, can also be used to vent the filling line adjacent to the filling valve during normal operation. In other words, the bypass line can be used to assign the further line an additional function for venting the filling line in the filling element.

In one exemplary embodiment, the further line is a discharge line which is connected (e.g., directly) to the filling line for discharging filling material and/or cleaning medium from the filling element. The discharge line, which already provides a connection to the filling line in the filling element, can thus advantageously be used to vent the filling line in the filling element. It is therefore advantageous to dispense with an additional, separate line just for venting.

It will be understood that, alternatively, it is possible for the further line to be intended only or primarily for venting.

In a further exemplary embodiment, the apparatus further has a bypass valve arranged in the bypass line. This advantageously enables safe and reliable use of the bypass line, as well as precise venting.

In one embodiment, the filling element has a further valve, preferably a return valve, in the further line. Advantageously, on the one hand, the function actually intended for the further line (e.g., discharging filling material or cleaning medium from the filling element at a desired time) can be reliably enabled, and, on the other, the venting function can be precisely controlled. The additional valve can thus be used advantageously for two completely different functions, saving costs and effort for otherwise additional valve technology.

In a further embodiment, the apparatus further has a control device which, preferably for venting the filling element (e.g., for venting the filling line in the filling element), is configured to:

- to open or hold open the bypass valve and/or to open the further valve; and/or
- in a working cycle in which a single container is filled (e.g., after a closing of the filling valve), to open the bypass valve or to hold it open and/or to open the further valve, preferably for a predetermined period of time (e.g., between 1 s and 5 s) and/or over a predetermined treatment angle (e.g., between 30° and 80°, preferably between 45° and) 60° of the apparatus configured as a rotary apparatus.

This advantageously enables a particularly reliable and rapid venting.

Preferably, the term "control device" can refer to an electronics system (e.g., embodied as a driver circuit or with microprocessor(s) and data memory) and/or a mechanical, pneumatic, and/or hydraulic controller, which can take over open-loop control tasks and/or closed-loop control tasks and/or processing tasks, depending upon the configuration. Although the term "control" is used herein, this can also comprise or be understood as "closed-loop control" or "control with feedback" and/or "processing" as appropriate.

In one embodiment variant, the control device is configured to open and/or hold open the further valve and the bypass valve simultaneously or at least in a temporally overlapping manner in the working cycle after the closing of the filling valve. This advantageously enables a particularly reliable and rapid venting.

In a further variant embodiment, the filling element has a static (e.g., annular or tubular) filling material throttle, preferably in the filling line. Preferably, the static filling material throttle can have a throttle diameter of ≤5 mm or ≤4 mm or ≤3 mm. The venting technology proposed here can therefore be advantageously used particularly in small container filling elements.

For example, the static filling material throttle can have a (filling material) flow cross-section of ≤20 $mm^2$ or ≤13 $mm^2$ or ≤8 $mm^2$ or ≤7.5 $mm^2$.

In one exemplary embodiment, the apparatus further has a filling material source for providing the filling material. Preferably, the supply line can connect the filling material source and the filling material reservoir to one another (e.g., directly) for supplying the filling material from the filling material source to the filling material reservoir. This advantageously provides a secure supply of filling material for filling the filling material reservoir and for venting the filling element.

In another exemplary embodiment, the apparatus further has an inspection device. Preferably, the further line can connect the filling line and the return reservoir to one another (e.g., directly) for discharging filling material and/or cleaning medium from the filling element to the return reservoir. Advantageously, a medium to be discharged via the further line can thus be discharged to the return reservoir, which can, for example, enable further use or safe disposal of the discharged medium.

In one embodiment, the apparatus further has a return gas line arranged to discharge return gas through the filling element when filling the container. Advantageously, the function of discharging the return gas via the return gas line, which is required during filling, can thus be provided separately from the venting function via the bypass and the further line, which can thus be used directly after filling.

In a further embodiment, at least one of the following conditions is met:

- the supply line opens into the filling material reservoir and/or ends in the filling material reservoir;
- the supply line runs completely outside the filling element; and
- the further line branches off from a portion, arranged in the filling element, of the filling line between the filling valve and the filling material reservoir.

In an embodiment variant, at least one of the following is fulfilled:

- the bypass line connects the supply line and the further line directly to each other;
- the bypass line is arranged completely outside the filling element;
- the bypass line is arranged in a stationary part of the apparatus configured as a rotary apparatus;
- the bypass line branches off from a portion of the supply line which, with respect to a filling material supply stream (e.g., from the filling material source), is arranged upstream of a media distributor, preferably a rotary media distributor, of the apparatus; and
- the bypass line opens into and/or ends in the further line, preferably in a portion which is arranged upstream of a media distributor, preferably a rotary media distributor, of the apparatus with respect to a filling material supply stream (e.g., from the filling material source).

A further aspect relates to a container processing facility (e.g., for controlling the temperature of, producing, cleaning, coating, testing, filling, closing, pasteurizing, labeling, printing, marking, laser marking, and/or packaging containers for liquid or pasty media, preferably beverages, liquid foods, or products from the pharmaceutical or healthcare industry). The container processing facility can have the apparatus as disclosed herein.

For example, the containers can be realized as bottles, cans, canisters, cartons, vials, tubes, etc.

A further aspect of the present disclosure relates to a method for operating an apparatus as disclosed herein for filling containers with a filling material. The method involves the following:

- filling a container with the filling material from the filling material reservoir via the filling line and the opened filling valve; and
- venting the filling element (e.g., the filling line in the filling element) (e.g., directly) after the filling by supplying the filling material from the supply line to the bypass line to the further line to the filling line to the filling material reservoir; and optionally
- filling a further container with the filling material from the filling material reservoir via the filling line and the opened filling valve (e.g., directly) after venting.

Advantageously, the method can achieve the same advantages as already described with reference to the apparatus. The same applies to the preferred exemplary embodiments of the method described below.

In one exemplary embodiment, at least one of the following is fulfilled:

- the venting of the filling element involves opening or holding open a bypass valve in the bypass line and/or opening a further valve in the further line, preferably in a portion of the further line in the filling element;

(e.g., directly) before the venting, the filling valve is closed at the end of the filling; and the filling and venting are carried out, preferably directly, one after the other in a common working cycle of the apparatus, in which cycle a single container is filled.

In a further exemplary embodiment, the method involves at least one of the following:

supplying, preferably initially supplying, the filling material via the supply line directly to the filling material reservoir, preferably from a filling material source;

discharging return gas from the container via a return gas line of the apparatus during filling;

discharging filling material from the filling line and/or the filling element via the further line (e.g., to a return reservoir and/or during a service operation, cleaning operation, or draining operation of the apparatus);

discharging cleaning medium from the filling line and/or the filling element via the further line (e.g., to a return reservoir and/or during a service operation, cleaning operation, or draining operation of the apparatus); and supplying or discharging a medium via the further line (e.g., directly) to the filling element or from the filling element (e.g., during a service operation, cleaning operation, or draining operation of the apparatus).

The preferred embodiments and features of the invention described above can be combined with one another as desired.

BRIEF DESCRIPTION OF THE FIGURES

Further details and advantages of the invention are described below with reference to the accompanying drawings, in which.

The embodiments shown in the figures correspond at least in part, so that similar or identical parts are provided with the same reference signs, and reference is also made to the description of other embodiments or figures for the explanation thereof to avoid repetition.

DETAILED DESCRIPTION OF EXEMPLARY EMBODIMENTS

Figure 1:
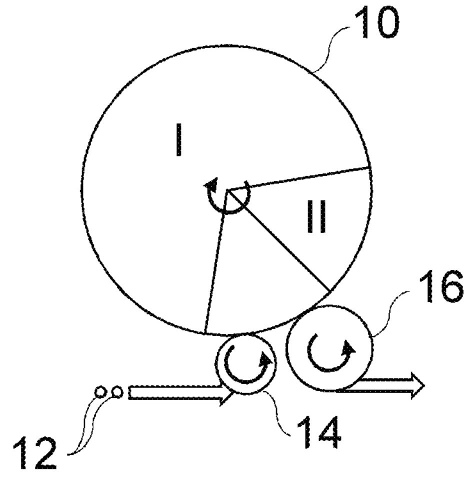
FIG. 1 shows a schematic representation of an apparatus according to an exemplary embodiment of the present disclosure.

FIG. 1 shows an apparatus 10 for filling containers 12 with a preferably liquid or pasty filling material.

The apparatus 10 can be connected to an inlet conveyor 14. The apparatus 10 can receive containers 12 from the inlet conveyor 14. The inlet conveyor 14 can, for example, be an inlet star, as shown, or a linear conveyor.

The apparatus 10 can be connected to an outlet conveyor 16. The apparatus 10 can transfer filled containers 12 to the outlet conveyor 16 for removal. The outlet conveyor 16 can, for example, be an outlet star, as shown, or a linear conveyor.

Figure 2:
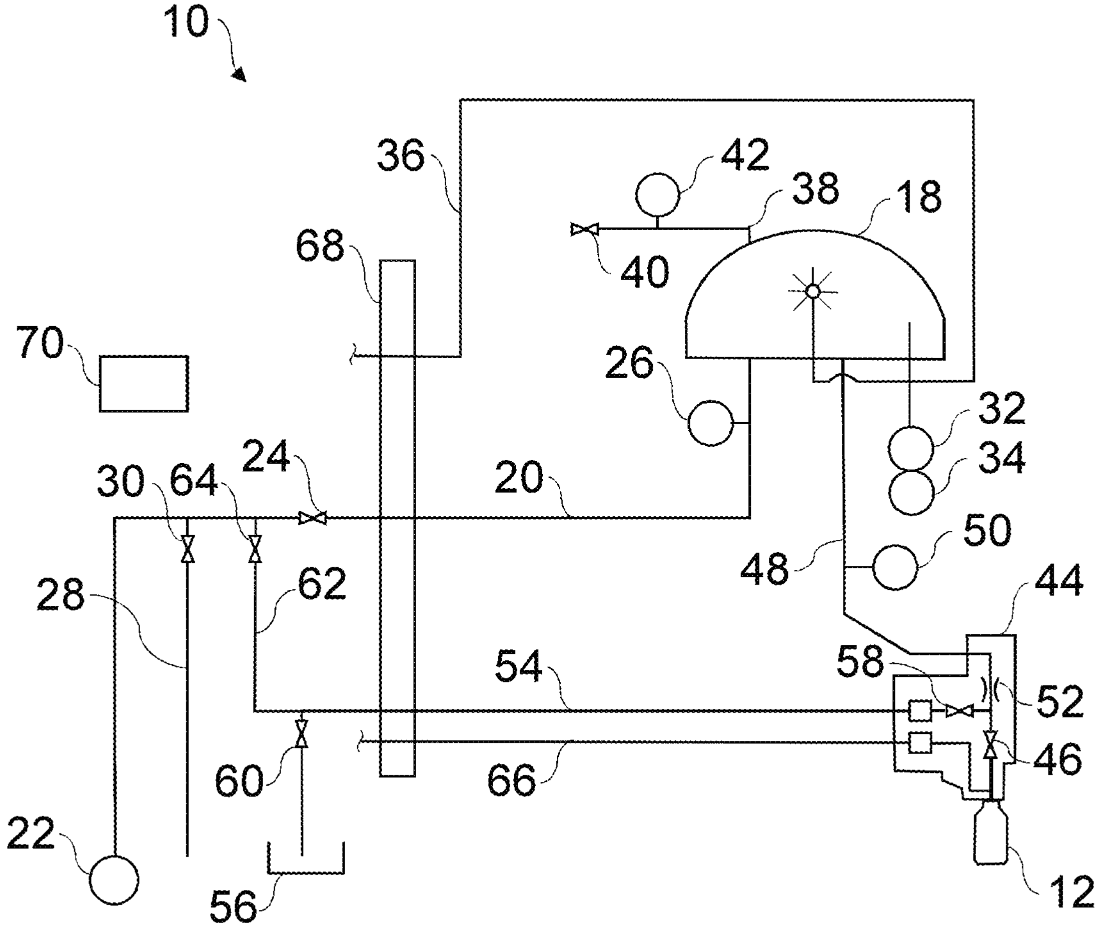
FIG. 2 shows a further schematic representation of the exemplary apparatus.

The apparatus 10 has at least one filling element, as described herein by way of example with reference to FIG. 2. Preferably, the apparatus 10 has a plurality of filling elements 44 for the simultaneous or temporally overlapping filling of a plurality of containers 12.

Preferably, the apparatus 10 is configured as a rotary filling apparatus. For example, the filling elements can be arranged, preferably evenly or equidistantly, distributed around a circumference of a filler carousel of the rotary filling apparatus. However, it is also possible, for example, for the apparatus 10 to be configured as a linear filling apparatus with, for example, a plurality of filling elements arranged one behind the other or next to one another.

The apparatus 10 can transport the containers 12 during filling from an inlet of the apparatus 10, e.g., at a transfer position with the inlet conveyor 14, to an outlet of the apparatus 10, e.g., at a transfer position with the outlet conveyor 16—for example, on a circular path.

For example, a closing apparatus for closing the containers 12 filled by the apparatus 10 can be arranged downstream of the apparatus 10. For example, the outlet conveyor 16 can transport the filled containers 12 in the direction towards the closing apparatus. Preferably, the closing apparatus can be configured as a rotary closing apparatus.

FIG. 2 schematically shows a portion of the apparatus 10.

The apparatus 10 has a filling material reservoir 18, a supply line 20, at least one filling element 44 with a filling valve 46, at least one filling line 48, at least one further line 54, and a bypass line 62, wherein, in FIG. 2, for the sake of clarity, only one filling element 44, only one filling line 48, and only one further line 54 are shown. The apparatus 10 can further comprise, for example, a media distributor 68 and/or a control device 70.

The filling material reservoir 18 stores the filling material. The filling material reservoir 18 is preferably a filling material tank or a filling material vessel, e.g., a filling material ring vessel.

Preferably, the filling material reservoir 18 is part of a filling carousel of the apparatus 10, which is preferably configured as a rotary filling apparatus. During operation of the apparatus 10, the filling material reservoir 18 can rotate about a main axis of rotation of the apparatus 10.

The (main) supply line 20 is connected to the filling material reservoir 18 for supplying the filling material to the filling material reservoir 18. The supply line 20 is preferably arranged completely outside the filling element 44.

Preferably, the supply line 20 can connect a filling material source 22 and the filling material reservoir 18 to one another. The filling material can be supplied from the filling material source 22 via the supply line 20 directly to the filling material reservoir 18.

The filling material source 22 can provide the filling material. For example, the filling material source 22 can be a tank filled with the filling material. The filling material source 22 is preferably stationary. For example, the filling material source 22 can be arranged separately from a filler carousel of the apparatus 10, which is preferably configured as a rotary filling apparatus.

Preferably, the supply line 20 opens into the filling material reservoir 18 or ends in the filling material reservoir 18. For example, the supply line 20 can open or end in a lower portion or bottom portion of the filling material reservoir 18. The supply line 20 can supply the filling material from the filling material source 22 directly into the lower portion/bottom portion of the filling material reservoir 18.

A supply valve 24 is preferably arranged in the supply line 20. The supply valve 24 can selectively release or block or optionally adjust a flow of filling material through the supply line 20 to the filling material reservoir 18. For example, the control device 70 can operate the supply valve 24 selectively to assume a release position or to assume a closed position or optionally to adjust a released flow cross-section.

Preferably, the supply valve 24 can be arranged upstream of the media distributor 68 with respect to a filling material supply flow from the filling material source 22.

Preferably, a (pressure) sensor 26 can detect a pressure in the supply line 20. The sensor 26 can send a signal indicating the detected pressure to the control device 70.

It is possible that the apparatus 10 has a (different) line 28 which is connected to the supply line 20. For example, the line 28 can branch off from the supply line 20. The line 28 can for example be a service line or a further supply line for the same filling product as from the filling material source 22 or a further filling product—for example, from a further filling material source. A valve 30 can be arranged in the line 28. The valve 30 can, for example, be a service valve. The valve 30 can selectively release or block a flow through the line 28 or optionally adjust it. For example, the control device 70 can operate the valve 30 selectively to assume a release position or to assume a closed position or optionally to adjust a released flow cross-section.

Preferably, the apparatus 10 can have at least one sensor 32, 34 for monitoring the filling material reservoir 18.

For example, a fill level of the filling material in the filling material reservoir 18 can be detected by a (fill-level) sensor 32. The sensor 32 can send a signal indicating the detected fill level of the filling material in the filling material reservoir 18 to the control device 70.

For example, a temperature of the filling material in the filling material reservoir 18 can be detected by a (temperature) sensor 34. The sensor 34 can send a signal to the control device 70 indicating a detected temperature of the filling material in the filling material reservoir 18.

It is possible that the apparatus 10 has a cleaning line 36. The cleaning line 36 can open into the filling material reservoir 18. A cleaning medium can be supplied to the filling material reservoir 18 via the cleaning line 36 for cleaning the filling material reservoir 18. For example, the cleaning line 36 can be connected to a cleaning medium source (not shown in the figures) for receiving a cleaning medium from the cleaning medium source.

Preferably, the cleaning line 36 can be connected to a spray device, e.g., a spray cone device, in the filling material reservoir 18. The spray device can spray cleaning medium supplied via the cleaning line 36 into the filling material reservoir 18 to clean the filling material reservoir 18.

It is possible that the apparatus 10 has a pressure relief line 38. The pressure relief line 38 can be connected to the filling material reservoir 18, preferably to an upper portion of the filling material reservoir 18. An undesirably high (e.g., over-) pressure in the filling material reservoir 18 can be reduced via the pressure relief line 38.

For example, a valve 40 can be arranged in the pressure relief line 38 to selectively block or release the pressure relief line 38. The valve 40 can preferably be configured as an (e.g., spring-loaded) overpressure valve (also called a safety valve or pressure limiting valve), e.g., with a valve element elastically preloaded in a closed position.

Preferably, a sensor 42 can be connected to the pressure relief line 38 for monitoring the pressure relief line 38. The sensor 42 can for example detect whether there is filling material in the pressure relief line 38. The sensor 42 can send a corresponding signal to the control device 70.

The container 12 can be filled with the filling material from the filling material reservoir 18 via the filling element 44. Preferably, the filling element 44 and the container 12 can be pressed against each other, preferably in airtight fashion, during the filling with the filling material. For example, a container mouth of the container 12 can be pressed against a centering bell of the filling element 44. For example, a lifting device can be included to press them together. The lifting device can, for example, lower the filling element 44 at least in portions onto a container mouth of the container 12 and/or lift a container holder (e.g., clamp or support plate), which supports the container 12 below the filling element 44, to bring it into contact with the filling element 44.

The filling element 44 has the filling valve 46. The filling element 44 can further have, for example, a static filling material throttle 52 and/or a further valve 58.

For example, the filling element 44 can be configured as a common structural unit made up of the components 46, 52, and/or 58. For example, the components 46, 52, and/or 58 can be arranged in a common housing of the filling element 44.

The container 12 can be filled with the filling material via the filling valve 46. The filling valve 46 can be opened in order to fill the container 12. The filling valve 46 can be closed to block a flow of the filling material through the filling valve 46. It is optionally possible for a flow cross-section of the filling valve 46 to be adjustable, e.g., to adjust a flow of the filling material through the filling valve 46.

For example, the filling valve 46 can have a movable valve element. Preferably, the valve element can be lifted off a, preferably annular, valve seat (e.g., in a vertical direction) in order to open the filling valve 46. The valve element can contact the valve seat in a sealing manner, so that the filling valve 46 is closed. Preferably, the valve element can be configured as a valve cone or a valve cone portion.

The filling valve 46 can be actuated in any conceivable manner—for example, mechanically, pneumatically, hydraulically, electromagnetically, or electrically. For example, the control device 70 can operate the filling valve 46 selectively to assume a release position or to assume a closed position or, optionally, to adjust a released flow cross-section.

A filling line 48 connects the filling material reservoir 18 and the filling valve 46 to one another for supplying the filling material from the filling material reservoir 18 to the filling valve 46, preferably directly.

Preferably, the filling line 48 can be arranged partly outside and partly inside the filling element 44. For example, a first portion of the filling line 48 can be arranged outside the filling element 44. Preferably, one end of the first portion of the filling line 48 can be adjacent to the filling material reservoir 18, e.g., to a lower region/bottom region thereof. An opposite second end of the first portion of the filling line 48 can be adjacent to the filling element 44. A second portion of the filling line 48 can be arranged in the filling element 44. A first end of the second portion of the filling line 48 can be adjacent to the second end of the first portion of the filling line 48. An opposite second end of the second portion of the filling line 48 can be adjacent to the filling valve 46.

Preferably, a sensor 50 for detecting the filling material can be connected in the filling line 48. For example, the sensor 50 can be arranged outside the filling element 44. For example, the sensor 50 for detecting the filling material can be arranged in the first portion of the filling line 48.

For example, a flow (e.g., a flow rate/volume flow) of the filling material through the filling line 48 and/or a flow direction of the filling material through the filling line 48 can be detected by a sensor 50. The sensor 50 can send a signal to the control device 70 indicating a detected flow rate and/or a detected flow direction of the filling material in the filling line 48.

The static filling material throttle 52 can be arranged in the filling element 44 for throttling a filling material flow. Specifically, the static filling material throttle 52 can preferably be arranged in the second portion of the filling line 48, e.g., directly adjacent to the filling valve 46. The static filling material throttle 52 can for example be an orifice or an orifice tube.

The static filling material throttle 52 can preferably have a comparatively small throttle diameter. For example, the static filling material throttle 52 can have a throttle diameter of ≤5 mm or ≤4 mm or ≤3 mm.

It is possible that a filling material throttle, preferably pneumatic or motor-driven, is arranged, for example, in the first portion of the filling line 48.

The further line 54 is connected to the filling line 48 for discharging and/or supplying a medium. The medium is preferably liquid, but in principle could also be gaseous.

Particularly preferably, the further line 54 is a discharge line. The further line 54 can be connected to the filling line 48 for discharging filling material and/or cleaning medium from the filling element 44. For example, the further line 54 can connect the filling line 48 and a return reservoir 56 to one another.

Preferably, the further line 54 can be arranged partly outside and partly inside the filling element 44. For example, a first portion of the further line 54 can be arranged outside the filling element 44. Preferably, one end of the first portion of the further line 54 can be adjacent to the return reservoir 56. An opposite, second end of the first portion of the further line 54 can be adjacent to the filling element 44. A second portion of the further line 54 can be arranged in the filling element 44. A first end of the second portion of the further line 54 can be adjacent to the second end of the first portion of the further line 54. An opposite, second end of the second portion of the further line 54 can be adjacent to the filling line 48. Preferably, the further line 54 can branch off from a (second) portion, arranged in the filling element 44, of the filling line 48.

At least one valve 58, 60 can be arranged in the further line 54. For example, the further valve 58 can be arranged in the filling element 44. Alternatively or additionally, the further valve 60 can be arranged outside the filling element. Preferably, the valve 58 and the valve 60 can be arranged on opposite sides of the media distributor 68.

Preferably, the at least one valve 58, 60 is configured as a return valve. The return valve can enable a return of filling material or cleaning medium from the filling element 44 to the return reservoir 56.

The valve 58 and/or 60 can selectively release or block a media flow through the further line 54 or optionally adjust it.

The bypass line 62 connects the supply line 20 and the further line 54 to each other, preferably directly. Via the bypass line 62, filling material can be supplied from the supply line 20 to the further line 54, and then from the further line 54 to the filling line 48.

Preferably, the bypass line 64 can branch off from a portion of the supply line 20 that is located upstream of the supply valve 24 and/or the media distributor 68 with respect to a filling material supply flow from the filling material source 22.

Preferably, the bypass line 64 can open into the further line 54 or end in the further line 54, preferably in a portion of the further line 54 between the valves 58 and 60 and/or, with respect to a filling material supply flow from the filling material source 22, upstream of the media distributor 68.

For example, the bypass line 62 can be arranged in a stationary/fixed part of the apparatus 10 preferably configured as a rotary apparatus. Preferably, the bypass line 62 can be arranged completely outside of the filling element 44.

Preferably, a bypass valve 64 can be arranged in the bypass line 62. The bypass valve 64 can selectively release or block or optionally adjust a flow of filling material through the bypass line 62. For example, the control device 70 can operate the valve 64 selectively to assume a release position or to assume a closed position, or optionally to adjust a released flow cross-section.

It is possible for the apparatus 10 to have additional valves and/or lines, such as a return gas line 66. The return gas line 66 is preferably arranged to discharge return gas through the filling element 44 when filling the container 12. Via the return gas line 66, return gas can be discharged from the container 12 during filling of the container 12 with the filling material. The return gas line 66 can, for example, have a first portion arranged in the filling element 44 and a second portion arranged outside the filling element 44.

It is also possible for example for the filling line 48, further line 54, and/or the return gas line 66 within the filling element 44 to have a buffer volume, as is indicated in FIG. 2 by way of example for the lines 54 and 66 by a box in each of the lines 54 and 66.

As already mentioned, it is possible that the apparatus 10 has the media distributor 68. The media distributor 68 can preferably be configured as a rotary distributor. The rotary distributor can connect at least one line portion of a stationary part of the apparatus 10 with at least one line portion of a rotating part (e.g., filler carousel) of the apparatus 10.

For example, the supply line 20, the cleaning line 36, the further line 54, and/or the return gas line 66 can pass through the media distributor 68. Preferably, the media distributor 68 configured as a rotary distributor can connect a fixed portion of the supply line 20, the cleaning line 36, the further line 54, and/or the return gas line 66 with a portion of the supply line 20, the cleaning line 36, the further line 54, or the return gas line 66 that rotates with the rotating part of the apparatus 10.

A method for operating the apparatus 10 is explained below.

Preferably, the apparatus 10 can be operated by the control device 70. Specifically, the control device 70 can for example operate the valve 24, 30, 46, 58, 60, and/or 64. Preferably, the control device 70 can receive a signal from the sensor 26, 32, 34, 42, and/or 50.

The apparatus 10 is operated in such a way that a container 12 is filled with the filling material from the filling material reservoir 18 by opening the filling valve 46. The container 12 is preferably positioned below the filling element 44 and/or the filling valve 46 during filling. For example, the control device 70 can operate the filling valve 46 to open.

It is possible that the container 12 is evacuated, rinsed, and/or preloaded before filling—for example, by the filling element 44.

The filling can be stopped for example by closing the filling valve 46. For example, the control device 70 can operate the filling valve 46 to close in order to terminate the filling.

The apparatus 10 is further operated in such a way that the filling element 44 is vented after filling by supplying the filling material from the supply line 20 via the bypass line 62 to the further line 54 to the filling line 48 to the filling material reservoir 18. For this purpose, for example the bypass valve 64 in the bypass line 62 and the valve 58 in the further line 54 can be opened, e.g., operated by the control device 70. Alternatively, for example, the bypass valve 64 can already be open, and only the valve 58 in the further line 54 be opened.

In order to convey air bubbles from the portion of the filling line 48 in the filling element 44, (partially) from the filling valve 46 and from the static filling material throttle 52, filling material can thus be supplied to the filling line 48 via the bypass line 62 and the further line 54. The supplied filling material can flow (together with the air bubbles conveyed) into the filling material reservoir 18 and thus further fill it.

During venting, the supply valve 24, the valve 30, and/or the valve 60 can preferably be closed.

Initially, and possibly also during operation, the filling material reservoir 18 can, however, be filled (mainly) directly with the filling material through the open supply valve 24 via the supply line 20 opening into the filling material reservoir 18, e.g., up to a desired fill level of the filling material in the filling material reservoir 18—for example, detected by the sensor 32.

Preferably, the filling and the venting take place, e.g., directly, one after the other in a common working cycle of the apparatus 10, wherein a single container 12 is filled in the working cycle.

For example, in the working cycle, after closing the filling valve 46, the bypass valve 64 and/or the valve 58 can be opened, preferably for a predetermined period of time and/or over a predetermined treatment angle of the apparatus 10 configured as a rotary apparatus. The valve 60, however, can be closed.

As shown by way of example in FIG. 1, a working cycle can have a first portion I and a second portion II. In the first portion I, the container 12 can be filled with the filling material, and for example the container 12 can be evacuated, rinsed, and/or preloaded beforehand. In the second portion II, the venting can take place.

Portions I and II can preferably be directly adjacent to each other.

Preferably, a time period specified for the first portion I and/or a treatment angle specified for the first portion I can be greater than a time period specified for the second portion II, or a treatment angle specified for the second portion II.

For example, a treatment angle for the filling (and possibly the prior evacuation, rinsing, and/or preloading), or for portion I, can be between 220° and 285°, e.g., between 250° and 260°.

For example, a treatment angle for the venting, or for portion II, can be between 30° and 80°, e.g., between 45° and 60°.

The apparatus 10 can preferably also be operated, e.g., in a cleaning mode, in such a way that a medium (e.g., cleaning medium or filling material) can be discharged from the filling element 44 via the further line 54, e.g., to the return reservoir. For example, the bypass valve 64 can be closed, and the valve 58 and/or 60 can be open. Alternatively or additionally, it is also possible for the apparatus 10 to be further operated in such a way that a medium different from the filling material (e.g., cleaning medium) can be supplied to the filling line 48 via the further line 54.

The invention is not limited to the preferred embodiments described above. Rather, a plurality of variants and modifications are possible which likewise make use of the inventive concept and therefore fall within the scope of protection. In particular, the invention also claims protection for the subject matter and the features of the dependent claims, irrespective of the claims to which they refer. In particular, the individual features of independent claim 1 are each disclosed independently of one another. In addition, the features of the dependent claims are also disclosed independently of all of the features of independent claim 1 and, for example, independently of the features relating to the presence and/or configuration of the filling material reservoir, the supply line, the filling element, the filling valve, the filling line, the further line, and/or the bypass line of independent claim 1. All ranges specified herein are to be understood as disclosed in such a way that all values falling within the relevant range are individually disclosed, e.g., also as the relevant, preferred, narrower outer limits of the relevant range.

LIST OF REFERENCE SIGNS

10 apparatus
12 container
14 inlet conveyor
16 outlet conveyor
18 filling material reservoir
20 supply line
22 filling material source
24 supply valve
26 (e.g., pressure) sensor
28 line
30 valve
32 (e.g., fill-level) sensor
34 (e.g., temperature) sensor
36 cleaning line
38 pressure relief line
40 valve
42 sensor
44 filling element
46 filling valve
48 filling line
50 (e.g., flow) sensor
52 static filling material throttle
54 further line
56 return reservoir
58 (further) valve
60 valve
62 bypass line
64 bypass valve
66 return gas line
68 media distributor
70 control device
I first portion
II second portion

What is claimed is:

1. An apparatus for filling containers with a filling material, wherein the apparatus comprises:

a filling material reservoir for storing the filling material;

a supply line connected to the filling material reservoir for supplying the filling material to the filling material reservoir;

a filling element with a filling valve (46) for filling the container with the filling material;

a filling line that connects the filling material reservoir and the filling valve to one another for supplying the filling material from the filling material reservoir to the filling valve;

a further line connected to the filling line for at least one of media discharge and media supply; and a bypass line which connects the filling material supply line and the further line to one another, for supplying the filling material from the supply line via the further line and the filling line to the filling material reservoir.

2. The apparatus according to claim 1, wherein at least one of:

the apparatus is a rotary apparatus; and the bypass line supplies the filling material from the supply line to the filling material reservoir for venting the filling element.

3. The apparatus according to claim 1, wherein the further line is a discharge line which is connected to the filling line for discharging at least one of filling material and cleaning medium from the filling element.

4. The apparatus according to claim 1, further comprising:

a filling material source for providing the filling material, wherein the supply line connects the filling material source and the filling material reservoir to one another for supplying the filling material from the filling material source to the filling material reservoir.

5. The apparatus according to claim 1, further comprising:

a return reservoir, wherein the further line connects the filling line and the return reservoir or discharging at least one of filling material and cleaning medium from the filling element to the return reservoir.

6. The apparatus according to claim 1, further comprising:

a return gas line arranged to discharge return gas through the filling element when filling the container.

7. The apparatus according to claim 1, wherein at least one of the following conditions is met:

the supply line at least one of opens into the filling material reservoir and ends in the filling material reservoir;

the supply line runs completely outside the filling element; and the further line branches off from a portion, arranged in the filling element of the filling line between the filling valve and the filling material reservoir.

8. The apparatus according to claim 1, wherein the filling element has a static filling material throttle.

9. The apparatus according to claim 8, wherein at least one of:

the filling element has a static filling material throttle in the filling line; and the static filling material throttle has a throttle diameter of ≤5 mm.

10. The apparatus according to claim 1, wherein at least one of the following conditions is met:

the bypass line connects the supply line and the further line directly to each other;

the bypass line is arranged completely outside the filling element;

the bypass line is arranged in a stationary part of the apparatus configured as a rotary apparatus;

the bypass line branches off from a portion of the supply line which, with respect to a filling material supply stream, is arranged upstream of a media distributor of the apparatus; and the bypass line at least one of opens into and ends in the further line of the apparatus with respect to a filling material supply stream.

11. The apparatus according to claim 10, wherein the media distributor is a rotary media distributor.

12. A method for operating the apparatus of claim 1 for filling containers with a filling material, wherein the method comprises:

filling a container with the filling material from the filling material reservoir via the filling line and the opened filling valve; and venting the filling element after the filling by supplying the filling material from the supply line to the bypass line to the further line to the filling line to the filling material reservoir.

13. The method according to claim 12, wherein at least one of the following conditions is met:

the venting of the filling element comprises at least one of opening or holding open a bypass valve in the bypass line and opening a further valve in the further line in the filling element;

before the venting, the filling valve is closed at the end of the filling; and the filling and the venting take place one after the other in a common working cycle of the apparatus, in which cycle a single container is filled.

14. The method according to claim 12, further comprising at least one of the following:

supplying the filling material via the supply line directly to the filling material reservoir;

discharging return gas from the container via a return gas line of the apparatus during filling;

discharging filling material from at least one of the filling line and the filling element via the further line;

discharging cleaning medium from at least one of the filling line and the filling element via the further line; and supplying or removing a medium one of via the further line to the filling element and from the filling element.

15. The method according to claim 14, wherein at least one of:

the venting of the filling element comprises at least one of opening or holding open a bypass valve in the bypass line and opening a further valve in a portion of the further line in the filling element;

the filling and the venting take place directly one after the other in a common working cycle of the apparatus, in which cycle a single container is filled;

the supplying is initially supplying the filling material via the supply line directly to the filling material reservoir; and the supplying of the filling material is from a filling material source of the apparatus.

16. The apparatus according to claim 1, further having a bypass valve arranged in the bypass line.

17. The apparatus according to claim 16, wherein the filling element has a further valve in the further line.

18. The apparatus according to claim 17, further having:

a control device which is configured at least one of:

to one of open and hold open the bypass valve;

to open the further valve; and in a working cycle in which a single container is filled, at least one of:

to open or hold open the bypass valve after a closing of the filling valve, and to open the further valve.

19. The apparatus according to claim 18, wherein the control device is configured to at least one of open and hold open the further valve and the bypass valve simultaneously.

20. The apparatus according to claim 18, wherein at least one of:

the further valve includes a return valve;

the control device is configured for venting the filling element;

the control device is configured to open the further valve for at least one of a predetermined period of time and over a predetermined treatment angle of the apparatus configured as a rotary apparatus.

* * * * *